US011499780B2

(12) United States Patent
Garot et al.

(10) Patent No.: US 11,499,780 B2
(45) Date of Patent: Nov. 15, 2022

(54) REFRACTORY ANCHOR

(71) Applicant: Silicon Refractory Anchoring Systems B.V., Wateringen (NL)

(72) Inventors: Jerome Michael Garot, Wateringen (NL); Danielle Francesca Garot, Wateringen (NL); Wouter Garot, Wateringen (NL)

(73) Assignee: SILICON REFRACTORY ANCHORING SYSTEMS B.V., Wateringen (NL)

( * ) Notice: Subject to any disclaimer, the term of this patent is extended or adjusted under 35 U.S.C. 154(b) by 0 days.

(21) Appl. No.: 17/605,361

(22) PCT Filed: Apr. 20, 2020

(86) PCT No.: PCT/EP2020/060994
§ 371 (c)(1),
(2) Date: Oct. 21, 2021

(87) PCT Pub. No.: WO2020/216715
PCT Pub. Date: Oct. 29, 2020

(65) Prior Publication Data
US 2022/0205721 A1    Jun. 30, 2022

(30) Foreign Application Priority Data

Apr. 26, 2019  (NL) .................................... 2023012

(51) Int. Cl.
*F27D 1/14*  (2006.01)
*B23K 1/00*  (2006.01)
*B23K 9/20*  (2006.01)

(52) U.S. Cl.
CPC ............ *F27D 1/141* (2013.01); *B23K 1/0008* (2013.01); *B23K 9/20* (2013.01)

(58) Field of Classification Search
None
See application file for complete search history.

(56) References Cited

U.S. PATENT DOCUMENTS

| D375,892 S | * | 11/1996 | Kraemer, Jr. ................. D8/384 |
| 10,190,314 B2 | * | 1/2019 | Garot ..................... B23K 31/02 |
| 10,352,619 B2 | * | 7/2019 | Yoder ................. B01J 19/0053 |

(Continued)

FOREIGN PATENT DOCUMENTS

| EP | 2985106 A2 | 2/2016 |
| JP | H09-229569 A | 9/1997 |

OTHER PUBLICATIONS

International Search Report (ISR) and Written Opinion (WO) for PCT/EP2020/060994 dated Jun. 18, 2020 (9 pages).

*Primary Examiner* — Joshua K Ihezie
(74) *Attorney, Agent, or Firm* — Shumaker, Loop & Kendrick, LLP (57) ABSTRACT

The invention relates to a refractory anchor comprising an elongated mounting pin having a first end and a second end opposite to the first end seen in the longitudinal direction of the elongated mounting pin, wherein the first end is weldable to an object, the refractory anchor further comprises at least one anchor fin having a first side at least partially connected to the elongated mounting pin. The invention further relates to an assembly comprising an object and a refractory anchor welded to the object, and to a method for manufacturing the assembly.

23 Claims, 4 Drawing Sheets

(56) References Cited

U.S. PATENT DOCUMENTS

2015/0013264 A1* 1/2015 Garot .................... E04B 1/4121
52/699
2018/0320973 A1* 11/2018 Yoder .................. B01J 19/0053
2020/0340511 A1* 10/2020 Garot ...................... F27D 1/141

* cited by examiner

REFRACTORY ANCHOR

TECHNICAL FIELD AND BACKGROUND

The invention relates to a refractory anchor comprising an elongated mounting pin having a first end and a second end opposite to the first end seen in the longitudinal direction of the elongated mounting pin, wherein the first end is weldable to an object, the refractory anchor further comprises at least one anchor fin having a first side at least partially connected to the elongated mounting pin.

The invention further relates to an assembly comprising an object and a refractory anchor welded to the object, and to a method for manufacturing the assembly.

US 2015/0013264 discloses an anchoring assembly used for anchoring a liner of a cured lining material arranged to be applied in liquid form to a metal object which is provided with the anchoring assembly. The anchoring assembly comprises an elongated mounting pin which is arranged to be welded, at a first end, to the metal object. The anchoring assembly further comprises a plurality of anchor fins connected to an anchoring nut. The anchoring nut is further screwed onto the mounting pin at a second end of the mounting pin.

SUMMARY

The known anchoring assembly provides excellent results for anchoring a liner of a cured lining material to a metal object. The liner or lining material is a protective material which is often simply called "refractory" for protecting equipment against a high temperature and/or abrasive environment as a result of processes occurring inside vessels, conduits, cyclones and other installations. In specific areas of the equipment, the known anchoring assembly is less suitable for anchoring a liner. Hence, it is an object of the present invention to provide an improved refractory anchor configured for anchoring the liner in specific areas of the equipment.

This object is achieved with the refractory anchor disclosed herein.

The refractory anchor comprises an elongated mounting pin having a first end and a second end opposite to the first end seen in the longitudinal direction of the elongated mounting pin, wherein the first end is weldable to an object. The refractory anchor further comprises at least one anchor fin having a first side at least partially connected to the elongated mounting pin, an opposing second end side and at least two sides between the first side and the second end side, wherein the at least two sides and the first side form two outer corners of the anchor fin and the at least two sides and the second end side form two outer corners of the anchor fin. Seen from a virtual horizontal plane around the first end of the elongated mounting pin, the smallest vertical height between one of the two outer corners formed by the second end side and the horizontal plane is smaller than the smallest vertical height between one of the two outer corners formed by the first side and the horizontal plane.

Within the designs of the processing equipment, for example a cyclone, there are a lot of edges, corners and transition surfaces. The installation layout can be aligned or off-set, depending on the requirement of the abrasion resistance. The refractory anchor as defined above allows smooth transitions on corners, edges and/or transition surfaces. Further, a relatively strong refractory anchor is provided which enables excellent liner anchoring results around corners, edges and/or transition surfaces in an object, for example a wall, to be protected.

The refractory anchor provides advantages in specific areas of the equipment with respect to installation time and anchoring quality of the liner after installation. The refractory anchor can be welded by stud welding to an object by means of the elongated mounting pin in a relatively fast manner and accurate manner with respect to its position. Further, the installation technique, in particular the welding technique used for welding the refractory anchor may be the same as welding the known anchoring assembly in other (large surface) areas of the installation. Hence, the operator does not have to switch tools and requires no additional trainings for learning more than one welding technique. In addition, the refractory anchor works perfectly with other types of refractory anchors for abrasion linings. When installing an abrasion resistant lining, the large surface can be completed with another type of refractory anchor, wherein close to a corner or edge the refractory anchor according to this document is used to merge seamlessly from for example the anchoring assembly disclosed in US 2015/0013264 to the refractory anchor according to this document. The configuration of the refractory anchor that seen from a virtual horizontal plane around the first end of the elongated mounting pin, the smallest vertical height between one of the two outer corners formed by the second end side and the horizontal plane is smaller than the smallest vertical height between one of the two outer corners formed by the first side and the horizontal plane, provides the desired flexibility to allow a seamless continuation of the same height of the liner in two areas for example divided by a corner in an object.

In a different aspect, the configuration of the refractory anchor further meets the criterion that the smallest vertical height between one of the two outer corners formed by the first side and the horizontal plane is larger than the largest vertical height between one of the two outer corners formed by the second end side and the horizontal plane. Such a configuration is particularly suited for refractory anchors for corners, such as corners having a perpendicular angle.

Further, the refractory anchor may also have projections in various directions for anchoring a liner such as for example further anchor fins connected to the elongated mounting pin in a virtual plane and/or in a further virtual plane making for example a perpendicular angle with the virtual plane defined by the at least one anchor fin. It is also possible to provide the anchor fin or at least one of the two anchor fins with so-called tabs which extend in a different direction than the anchor fin such that the refractory anchor provides excellent anchoring results. Each tab may define an acute angle with the anchor fin, preferably the acute angle lies between 35-85 degrees, more preferably between 50-70 degrees. Further, the dimensions such as the length of the at least one anchor fin or the two anchor fins located in one plane can be made longer or shorter depending on the installation circumstances.

In an aspect, the anchor fin has a connector or the two anchor fins are connected to each other by a connector, wherein the connector is connected to the elongated mounting pin, wherein the connector and the anchor fin(s) are made in one piece and/or from one and the same material. Such a connector can be used to connect the anchor fin(s) in a fast manner to the elongated mounting pin and provides a strong, reliable and long lasting connection between the anchor fin(s) and the elongated mounting pin. The connector may provide a through hole for receiving the elongated mounting pin for providing a connection between the elongated mounting pin and the connector. A relatively fast, simple, safe and operator-friendly technique is by providing the connection between the elongated mounting pin and the connector by friction fit, i.e. after positioning the elongated mounting pin into the through hole, a second end of the elongated mounting pin opposite to the end to be welded to the object is subjected to pressure such that an end section directly located below the second end expands for fixing the end section inside the through-hole of the connector. Such a connection can be provided in a relatively fast manner and has provided excellent long lasting results, in particular inside high temperature processing vessels/cyclones.

Further, the elongated mounting pin may be advantageously made from a different material than the anchor fin(s) and the connector if present. The elongated mounting pin may be made from a first alloy and the anchor fin(s) may be made of a second alloy different from the first alloy. The first alloy is for example configured for optimal welding results of the elongated mounting pin to an object such as for example a backing plate. The anchor fin(s) may be made of a second alloy different from the first alloy, wherein the second alloy is configured for providing optimal anchoring results of the liner and/or for providing maximum protection against the high temperature and/or abrasive environment of processes occurring inside the vessel/cyclone. The elongated mounting pin is advantageously made of a material configured for stud welding the elongated mounting pin to an object, for example a metal plate. Hence, by using stud welding technique, the installation time of the refractory anchors is relatively fast, in particular compared to hand welding or spot welding.

In a further aspect, each anchor fin has an anchor fin portion extending above (higher than) the second end of the elongated mounting pin seen in the longitudinal direction of the elongated mounting pin. The sides of the anchor fin portions facing each other define a space between these sides, wherein the space is directly located above the second end of the elongated mounting pin seen in the longitudinal direction of the elongated mounting pin. This space is also identified as a submerged section. This space provides stronger refractory anchors in vessels/cyclones in that the refractory anchors with these spaces are able to withstand higher temperatures. After installing the refractory anchor and after applying a lining material over the refractory anchor, the lining material fills the space and after curing the space is filled with liner. This liner in the space provides a temperature buffer, because the liner conducts heat less well than the refractory anchor, in particular the elongated mounting pin of the refractory anchor. After installation the hot side of the refractory anchor is the side which is furthest away from the object to which the refractory anchor has been welded. By providing the space between the sides of the anchor fin portions facing each other, which space is filled with heat-insulating liner, there is no direct heat path between the hot side located above upper sides of the anchor fin portions and the second end of the elongated mounting pin. By burying the second end of the elongated mounting pin with heat-insulating liner provided in the space of the submerged section, the temperatures in the elongated mounting pin, in particular towards the first end of the elongated mounting pin, can be reduced drastically. Under certain high temperature conditions in the vessel/cyclone, a direct heat path may damage the weld between the refractory anchor and the object. In these high-temperature situation the submerged section extends the life-time of the refractory anchor, without requiring undesired short maintenance or inspecting intervals. Hence, by providing the liner temperature buffer in the submerged section there is no direct heat path between the hottest side of the refractory anchor and the first end welded to the object, which provides a longer lasting refractory anchor configured to be used in vessels/cyclones configured for relatively high-temperature processes.

In a different aspect, the sides of the anchor fin portions facing each other have a cut-out. These cut outs provide improved anchoring results of the liner in the space between these sides of the anchor fin portions facing each other and contribute in reducing a heat path from the hot side of the refractory anchor to the first end of the elongated mounting pin welded or to be welded to the object.

The elongated mounting pin of the refractory anchor may further comprise between a connection section of the elongated mounting pin with the anchor fin(s) and the first end weldable to an object, a section where there is a distance measured perpendicular with respect to the elongated mounting pin between the elongated mounting pin and a portion of the first side of the at least one anchor fin facing the elongated mounting pin. This distance reduces a direct or relatively short heat path between the anchor fin(s) and the end weldable to an object, such that a longer lasting refractory anchor can be provided. This distance also improves the flow path of the liquid lining material around the refractory anchor which improves the quality of the cured liner, because an improved flow reduces the number of cavities in the cured liner.

The or each plate-like anchor fin may have at least one rounded corner. In particular, at least the outer corners of the anchor fin located after installation relatively close to an object compared to the other two outer corners of the plate-like anchor fin are rounded corners. The outer corners relatively close to an object being more submerged in the lining material. The rounded corner reduces the risks of cracks in the liner compared to conventional straight corners drastically, because in use the refractory anchor may experience thermal expansion and/or vibrations as a result the sharp corners provided by straight corners are able to cut into the cured lining material which may provide cracks/bursts in the liner after a certain period of use.

It is a further object to provide an assembly comprising an object and a refractory anchor described above. This object is achieved with the claim directed to an assembly. The refractory anchor is further configured to be positioned at least partially around a corner of the object such that the two outer corners formed by the second end side are positioned past/behind the object corner seen from the end of the elongated mounting pin welded to the object and the two outer corners formed by the first side are positioned before the object corner seen from the end of the elongated mounting pin welded to the object.

It is also an object to provide a method for providing the above assembly. This object is achieved according to the claim directed to a method. The refractory anchors are joined to the object by stud welding, preferably drawn arc stud welding. Further, the refractory anchor is welded to the object such that the at least one anchor fin is positioned around a corner of the object such that the two outer corners formed by the second end side are positioned past/behind the object corner seen from the end of the elongated mounting pin welded to the object and the two outer corners formed by the first side are positioned before the object corner seen from the end of the elongated mounting pin welded to the object.

BRIEF DESCRIPTION OF THE FIGURES

The present invention will be explained in more detail below with reference to the appended figures showing exemplary embodiments of a refractory anchor and an assembly.

FIG. 2 shows a front view of the first embodiment of a refractory anchor shown in FIG. 1a;

DETAILED DESCRIPTION

Like parts are indicated by the same reference signs in the various figures.

Each feature disclosed with reference to the figure can also be combined with another feature disclosed in this disclosure including the claims, unless it is evident for a person skilled in the art that these features are incompatible.

Figures 1A, 1B:
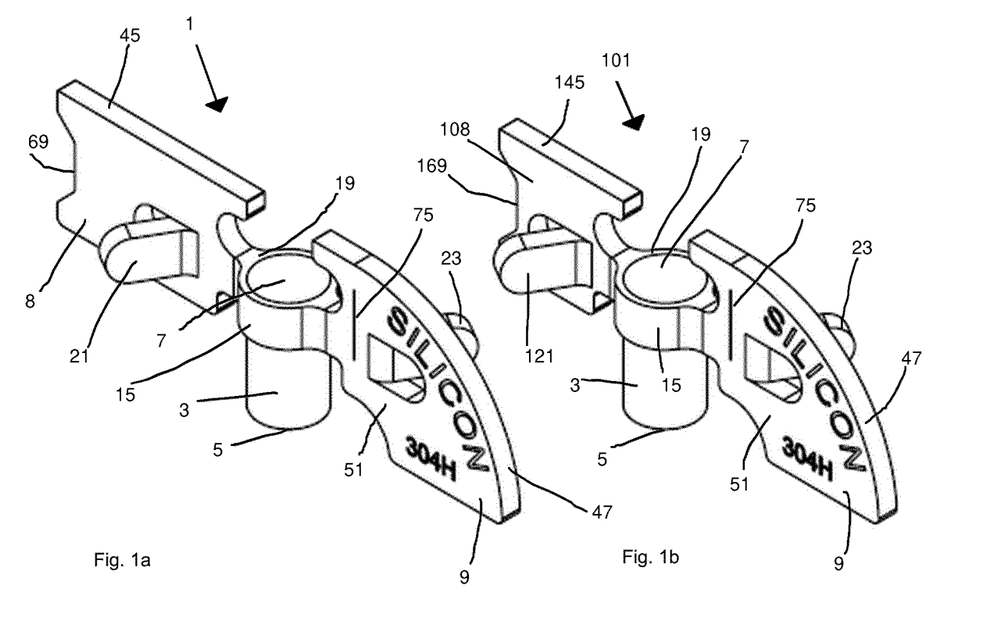
FIGS. 1a and 1b show perspective views of a first and second embodiment of a refractory anchor.
Figure 2:
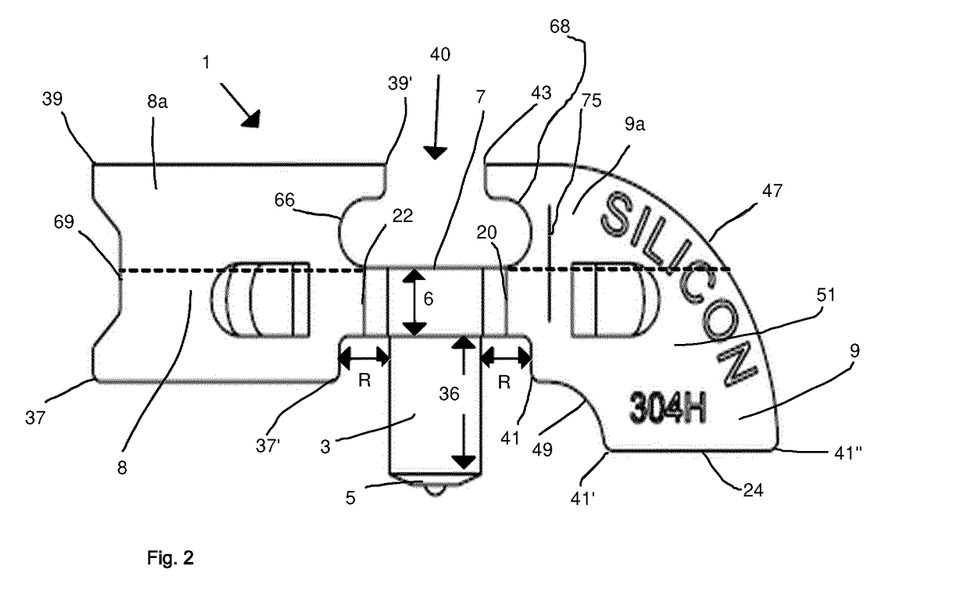
Figure 5A:
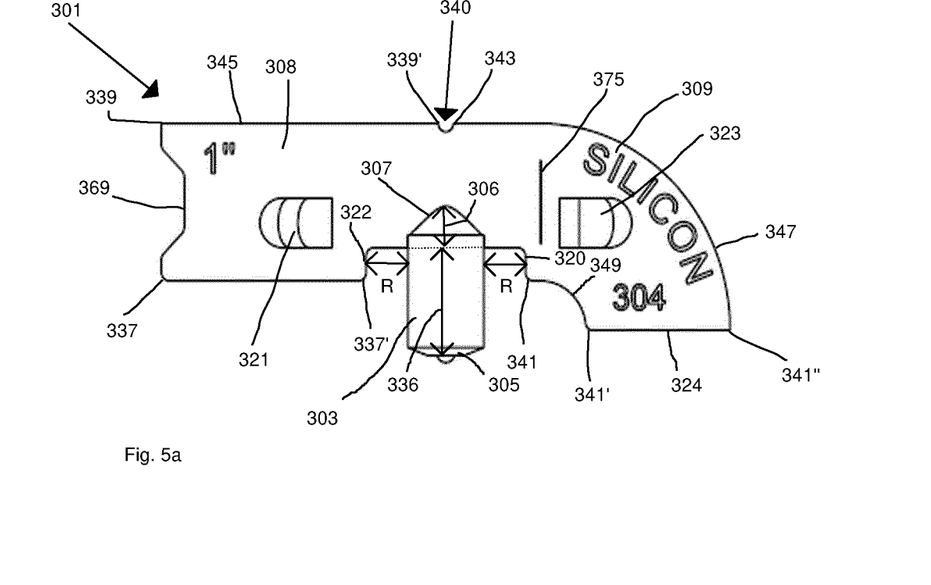
FIGS. 5a and 5b show various views of a third embodiment of a refractory anchor.
Figure 5B:
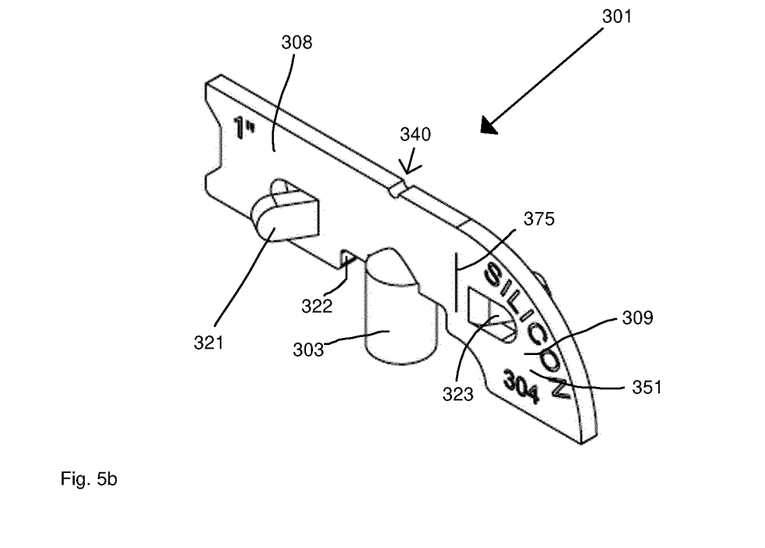
Figure 6:
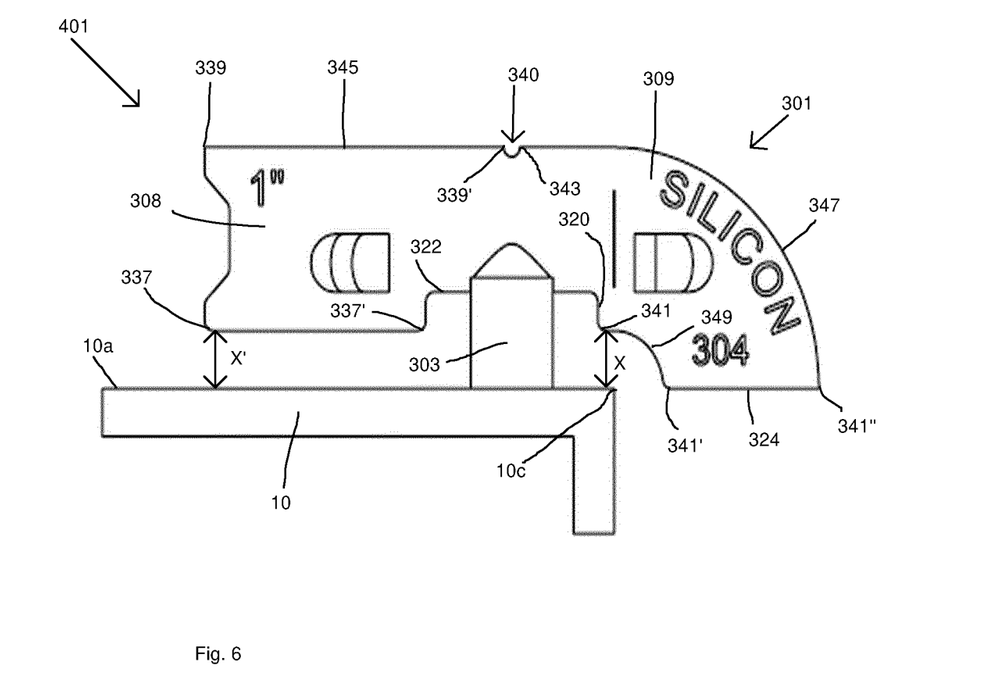
FIG. 6 shows a front view of an assembly comprising the third embodiment of a refractory anchor shown in FIGS. 5a and 5b.

FIGS. 1-4 show an assembly 201 and two embodiments of a refractory anchor 1; 101, wherein the two refractory anchors 1; 101 shown in FIG. 1a,b only differ in that the anchor fins 8; 108 have a different length, i.e. the anchor fin 108 of the refractory anchor 101 is shorter than the anchor fin 8 of the refractory anchor 1. FIGS. 5a-b and 6 show a refractory anchor 301 and an assembly 401, wherein the anchor fins 308, 309 are connected with each other and with an elongated mounting pin 303.

Figure 3:
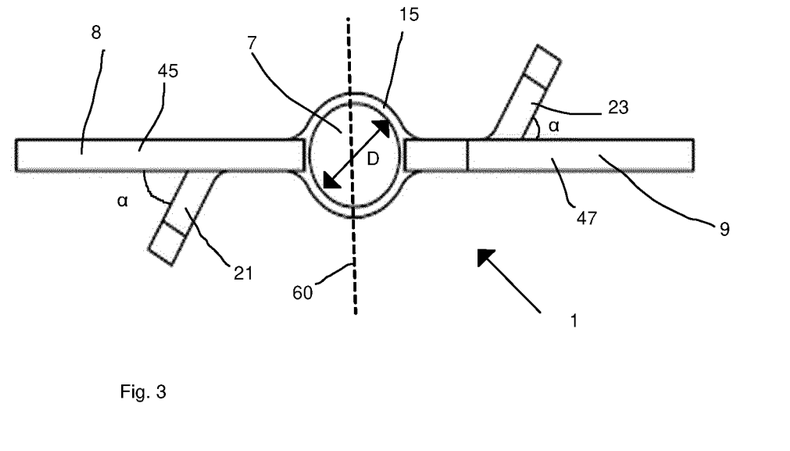
FIG. 3 shows a top view of the first embodiment of a refractory anchor shown in FIGS. 1a and 2.

The refractory anchor 1; 101; 301 comprises an elongated mounting pin 3; 303 of which a first end 5; 305 is weldable to an object 10 and two plate-like anchor fins 8, 9; 108, 9; 308, 309 connected to an end section or connection section indicated by arrow 6; 306 adjacent a second end 7; 307 of the elongated mounting pin 3; 303. The two plate-like anchor fins 8, 9; 108, 9; 308, 309 extend outwardly in two opposing directions seen from the elongated mounting pin 3; 303. Further, as can be seen best in FIGS. 3; 5b the two anchor fins 8, 9; 108, 9; 308, 309 of each refractory anchor 1, 101; 301 lie in one virtual plane. This virtual plane also extends through the center line (not shown) of the elongated mounting pin 3; 303. In addition, the refractory anchor 1, 101; 301 is configured from a material perspective and/or a design perspective to contribute in anchoring the liner on the two sides divided by the virtual plane defined by the two anchor fins 8, 9; 108, 9; 308, 309. Each anchor fin 8, 9; 108, 9; 308, 309 is provided with a tab 21, 23; 121, 23; 321; 323 directed to different sides of the virtual plane defined by the two anchor fins 8, 9; 108, 9; 308, 309. Each tab 21, 23; 121, 23; 321; 323 defines an acute angle α with the anchor fin 8, 9; 108, 9; 308, 309 as for example is shown in FIG. 3. The acute angle lies between 35-85 degrees, more preferably between 50-70 degrees. To further improve the liner anchoring results it is further optionally possible to provide additional anchor fins (not shown) connected to the elongated mounting pin 3; 303 extending in a different direction than the two anchor fins 8, 9; 108, 9; 308, 309.

Figure 4:
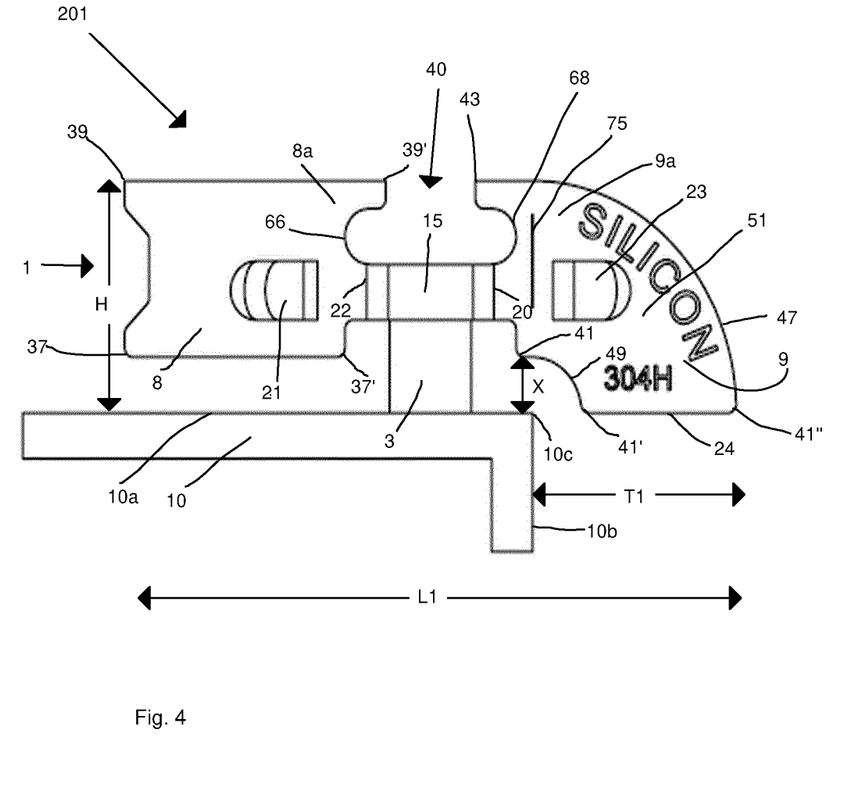
FIG. 4 shows a front view of an assembly comprising the first embodiment of a refractory anchor shown in FIGS. 1a, 2 and 4.

The two anchor fins 8, 9; 108, 9 of the refractory anchors 1, 101 shown in FIGS. 1a-b-4 are connected to each other by a connector 15, wherein the connector is connected to the elongated mounting pin 3. The connector 15 and the two anchor fins 8, 9; 108, 9 are made in one piece, and the connector and the two anchor fins 8, 9; 108, 9 are made from the same material, wherein the composition of this material is configured for providing long lasting results for anchoring a liner. The connector 15 comprises a through hole 19 for receiving the connection section 6 of the elongated mounting pin 3 for providing a connection between the elongated mounting pin 3 and the connector 15, wherein the connection between the elongated mounting pin 3 and the connector 15 is provided by friction fit which has various advantages in that the friction fit is faster, simpler, safer and more operator-friendly over other known connecting techniques such as an inner thread (not shown) of the through hole cooperating with an outer thread (not shown) on the elongated mounting pin or by welding the connector to the elongated mounting pin.

The elongated mounting pin 3; 303 further comprises a section indicated by arrow 36; 336 below the connection section 6; 306 where there is a distance indicated by arrow R (FIG. 2) between side portions of a first side 20, 22; 320, 322 of each anchor fin 8, 9; 108, 9; 308, 309 facing each other and the elongated mounting pin 3; 303. This distance R improves the flow of the liquid lining material and reduces a direct or relatively short heat path between upper sides 45, 47; 145, 47; 345, 347 (FIGS. 1a-b and 5a-b) of the anchor fins 8, 9; 108, 9; 308, 309 and the end 5; 305 of the elongated mounting pin 3; 303 weldable or welded to object 10, such that a refractory anchor can be provided with an improved configuration to withstand high temperatures on the "hot side" of the refractory anchor 1; 101; 301. After installation, the upper sides 45, 47; 145, 47; 345, 347 of the refractory anchor 1, 101; 301 are facing the "hot side".

Further, each plate-like anchor fin 8, 9; 108, 9 of the refractory anchor 1; 101 shown in FIGS. 1a-b-4 has rounded corners 37, 37'; 41, 41', 41", i.e. at least the outer corners 37, 37'; 41, 41' of each plate-like anchor fin 8, 9; 108, 9 located after installation relatively close or closer to the object 10; 110 than the other outer corners 39, 39'; 43 of each plate-like anchor fin 8, 9; 108, 9 are rounded corners. Outer corner 41" is also rounded in the embodiment shown, which is optional, but could be preferred if the liner thickness on object side 10b of the object 10 exceeds a thickness indicated by arrow T1. Without being bound by theory, the modification of the corners 37, 37'; 41, 41', 41" into round corners instead of sharp corners has reduced the number of cracks after a predetermined time period of use in the liner drastically. Of course, it is also possible to make all corners of the anchor fin 8, 9; 108, 9 round, but the reducing cracks/bursts effect will be less for the upper corners 39, 39'; 43 as these outer corners 39, 39'; 43 are flush with the liner upper surface, i.e. the liner thickness normally corresponds to the height indicated by arrow H. The refractory anchor 301 is provided with a sharp corner 341", but a rounded corner for corner 341" is also possible if it is desired to achieve the above described advantages of a rounded corner.

The refractory anchor 1, 101; 301 only comprises two anchor fins 8, 9; 108, 9; 308, 309. Such a refractory anchor 1; 101; 301 provides excellent liner anchor results for corners in an object, wherein the center lines of the elongated mounting pins 3, 303 of the refractory anchors 1; 101; 301 can be aligned in one virtual plane indicated for example by dotted line 60 in FIG. 3 which extends perpendicular to the virtual plane provided by the two anchor fins 8, 9; 108, 9; 308, 309.

The two plate-like anchor fins 8, 9; 108, 9; 308, 309 of each refractory anchor 1, 101 are not identical and each has a different function. The plate-like anchor fin 8; 108; 308 is used above a relatively flat surface 10a of the object, wherein the plate-like anchor fin 9; 309 is used to allow smooth transitions on corners, edges and/or transition surfaces, for example the object corner 10c as shown in FIG. 4 or in FIG. 6.

The anchor fin 9 of the refractory anchor 1; 101 shown in FIGS. 1a-b-4 has a first side 20 at least partially connected to the elongated mounting pin 3 by means of connector 15, an opposing second end side 24 and two sides 47, 49 between the first side 20 and the second end side 24 for forming four outer corners 41, 41', 41", 43 of the anchor fin 9, wherein seen from a virtual horizontal plane, for example object surface 10a, around the first end 5 of the elongated mounting pin 5, the smallest vertical height between one of the two outer corners 41', 41" formed by the second end side 24 and the horizontal plane is smaller than the smallest vertical height indicated by arrow X between one of the two outer corners 41, 43 formed by the first side 20 and the horizontal plane. The smallest vertical height between the two outer corners 41', 41" formed by the second end side 24 and the horizontal plane is identical and almost zero in the refractory anchor 1; 101 shown in the figures. Hence, the smallest vertical height indicated by arrow X between one of the two outer corners 41, 43 formed by the first side 20 and the horizontal plane is in the refractory anchor 1; 101 also larger than the largest vertical height between one of the two outer corners 41', 41" formed by the second end side 24 and the horizontal plane.

The anchor fin 309 of the refractory anchor 301 shown in FIGS. 5a-b-6 has a first side 320 partially connected to the elongated mounting pin 303 in a direct manner without connector, an opposing second end side 324 and two sides 347, 349 between the first side 320 and the second end side 324 for forming four outer corners 341, 341', 341", 343 of the anchor fin 309, wherein seen from a virtual horizontal plane, for example object surface 10a around the first end 305 of the elongated mounting pin 305, the smallest vertical height between one of the two outer corners 341', 341" formed by the second end side 324 and the horizontal plane is smaller than the smallest vertical height indicated by arrow X (FIG. 6) between one of the two outer corners 341, 343 formed by the first side 320 and the horizontal plane. The smallest vertical height between the two outer corners 341', 341" formed by the second end side 324 and the horizontal plane is identical and almost zero in the refractory anchor 1; 101 shown in the figures. Hence, the smallest vertical height indicated by arrow X between one of the two outer corners 341, 343 formed by the first side 320 and the horizontal plane is in the refractory anchor 301 also larger than the largest vertical height between one of the two outer corners 341', 341" formed by the second end side 324 and the horizontal plane.

As can be clearly seen in the figures for side surface 51; 351 each of the two side surfaces 51; 351 between the outer corners 41, 41', 41", 43; 341, 341', 341", 343 have substantially the shape of a quarter of an annulus. The two sides 47, 49; 347, 349 between the first side 20; 320 and the second end side 24; 324 of the anchor fin 9; 309 have different lengths, in particular the side 47; 347 of the two sides 47, 49; 347, 349 located further away from the object 10 after installation is at least two times longer than the other side 49; 349 of the two sides 47, 49; 347, 349, wherein the other side 49; 349 is located closer to the object 10 after installation. The sides 47, 49; 347, 349 extend between the corners 41, 41', 41", 43; 341, 341', 341", 343 with a largely constant radius of curvature, wherein the radius of curvature of side 47; 347 is larger, for example at least two times larger than the radius of curvature of side 49; 349.

The anchor fin 9; 309 is configured to be positioned above a transition, for example an object corner 10c or an object edge. The anchor fin 9; 309 further comprises an indicator 75; 375, i.e. an indicator line on at least side surface 51; 351, for aligning the refractory anchor with a transition, for example an object corner or an object edge, for example object surface 10b. The indicator facilitates an operator to position the refractory anchor 1; 101; 301 in a quick and accurate manner on the correct position with respect to the transition, such as object corner 10c.

In the refractory anchor 1; 101 shown in FIGS. 1a-b-4, each anchor fin 8, 9; 108, 9 has an anchor fin portion 8a, 9a (indicated by dotted lines in FIG. 2 in the anchor fins) which extends above the second end 7 of the elongated mounting pin 3 seen in the longitudinal direction of the elongated mounting pin 3. The sides of the anchor fin portions 8a, 9a facing each other define a space 40 between these sides. This space 40 provides a submerged section and this submerged section can be filled with lining material providing a liner temperature buffer in the submerged section such that there is no direct heat path between the hottest side of the refractory anchor and the first end 5 welded to the object 10. For the sake of brevity, reference is made to the above description for the advantages of the submerged section. As can be seen in the front view of FIGS. 2 and 4 both sides of the anchor fin portions 8a, 9a facing each other have a cut-out 66, 68. Further, anchor fin side 69; 169 of the plate-like anchor fin 8; 108 facing away from the elongated mounting pin 3 comprises a cut-out between two outer corners 37, 39 of the plate-like anchor fins 8; 108. These cut outs prevent or reduce heat transfer between two adjacent positioned refractory anchors (not shown). Further, the cut-out provides improved anchoring results of the liner.

The longest dimension L1 of the refractory anchors 1, 101; 301 is relatively small, i.e. smaller than 20 cm for example approximately 8 cm. Each anchor fin 8, 9; 108, 9; 308, 309 may have a thickness indicated by arrows T in FIG. 3 smaller than 1 cm for example approximately 3 mm. The height indicated by arrow H in FIG. 4 of the refractory anchor 1, 101; 301 measured from the object 10 is smaller than 7.5 cm, for example 2.5 cm. As shown in the drawings the elongated mounting pin 3; 303 has a cylindrical shape. However, different shaped pins having corners for forming a pin having a polygonal cross-section can also be used, for example a plate shaped pin. The diameter indicated by arrow D of the elongated mounting 3 is smaller than 2.5 cm, for example 1 cm. The distance R is approximately 0.5 cm. The vertical height indicated by arrow X is approximately 1.0 cm. The vertical height X, X' is important in an assembly as shown in FIGS. 4 and 6 to guarantee that lining material in liquid form is free to flow under the anchor fins 8, 9; 108, 9; 308, 309 to obtain excellent lining results. In the assembly 201; 401, the mounting pin 3; 303 is arranged with respect to the anchor fins 8, 9; 108, 9; 308, 309 to provide the vertical height X, X'. In particular, the distance X, X' between the corners 37, 37', 41; 337, 337', 341 of the anchor fins 8, 9; 108, 9; 308, 309 located directly above the object surface 10a ensures excellent flow results of liner material in liquid form between the anchor fins and the object surface 10a. As can be seen in FIGS. 4 and 6, the corners 41', 41", 341', 341' are as a result of object corner 10c not located above the object surface 10a.

The refractory anchor 301 also comprises a space 340, wherein the shown space 340 is smaller than the space 40 shown in the refractory anchor 1, 101. It is noted that space 340 may have larger dimensions than shown in FIG. 5a-b and 6, and/or each anchor fin 308, 309 may also be provided with a cut-out as described above with reference to the refractory anchor 1, 101, in particular if it is desired to obtain the advantages of the space 40 as discussed above.

As can be seen the fins 308, 309 in the anchor shown in FIGS. 5a-b and 6 are formed from one plate by cutting or casting the plate in a predetermined manner. The refractory anchor 301 is then provided by connecting the mounting pin 303 between the fins 308, 309. The fins 308, 309 can be directly connected by for example soldering/welding to the mounting pin 303. Alternatively, a stronger connection can be obtained by providing a groove (not shown) in end section or connection section indicated by arrow 306 adjacent a second end 307 of the elongated mounting pin 303, wherein the width of the groove is configured to receive the plate with the fins 308, 309 without much play, wherein by soldering/welding the plate is connected in the groove of the second end 307 of the elongated mounting pin 303. The conical part shown in these figures as connection section 306 can also be cast in one operation with the plate and the fins 308, 309, such that the conical part is not part of the elongated mounting pin (not shown), wherein the conical part and the fins are connected by soldering/welding to the second end of the elongated mounting pin.

The refractory anchor 1; 101; 301 shown in the figures of this document comprises a first anchor fin 8; 108; 308 which can also be identified as first anchor fin section and a second anchor fin 9; 309 which can also be identified as second anchor fin section, wherein the two anchor fins 8, 9; 108, 9; 308, 309 lie in one virtual plane which also extends through the center line (not shown) of the elongated mounting pin 3; 303 arranged between the first anchor fin 8; 108; 308 and the second anchor fin 9; 309, wherein the refractory anchor 1; 101; 301 comprises a first anchor fin end side 69; 169; 369 between outer corners 37, 39; 337, 339 and a second end side 24; 324 between outer corners 41', 41"; 341', 341", wherein seen from a virtual horizontal plane, for example object surface 10a around the first end 5; 305 of the elongated mounting pin 3; 303, the smallest vertical height between one of the two outer corners 41', 41"; 341', 341" formed by the second end side 24; 324 and the horizontal plane is smaller than the smallest vertical height indicated by arrow X' between one of the two outer corners 37, 39; 337, 339 formed by the first anchor fin end side 69; 169; 369 and the horizontal plane. The smallest vertical height between the two outer corners 41', 41"; 341', 341" formed by the second end side 24; 324 and the horizontal plane as defined by object surface 10a is identical and almost zero in the refractory anchor 1; 101; 301 shown in the FIGS. 4 and 6. It is also possible that this vertical distance has a negative value with respect to the object surface 10a, wherein a negative value is considered to be smaller than a positive value. Hence, the smallest vertical height indicated by arrow X' between one of the two outer corners 37, 39; 337, 339 formed by the first anchor fin end side 69; 169; 369 and the horizontal plane defined by object surface 10a is in the refractory anchor 1; 101; 301 also larger than the largest vertical height between one of the two outer corners 41', 41"; 341', 341" formed by the second end side 24; 324 and the horizontal plane. Further, it is possible to provide a refractory anchor as shown in FIGS. 5a-b and 6 without a space 340.

It is further possible to provide a refractory anchor having only anchor fin 9 as described above (not shown in the figures).

In the anchor fin configured for lining object corners at least one of the two sides between the first side and the second end side forming outer corners of the anchor fin may have at least one additional corner (not shown), wherein the at least one additional corner is located between one of the two outer corners formed by the first side and one of the two outer corners formed by the second end side. Further, it is possible that each of the two side surfaces have substantially the shape of a turned L (not shown), instead of the two side surfaces 51 having substantially the shape of a quarter of an annulus.

The invention claimed is:

1. A refractory anchor comprising an elongated mounting pin having a first end and a second end opposite to the first end seen in the longitudinal direction of the elongated mounting pin, wherein the first end is weldable to an object, the refractory anchor further comprises at least one anchor fin having a first side at least partially connected to the elongated mounting pin, an opposing second end side and at least two sides between the first side and the second end side, wherein the at least two sides and the first side form two outer corners of the anchor fin and the at least two sides and the second end side form two outer corners of the anchor fin, wherein seen from a virtual horizontal plane around the first end of the elongated mounting pin, the smallest vertical height between one of the two outer corners formed by the second end side and the horizontal plane is smaller than the smallest vertical height between one of the two outer corners formed by the first side and the horizontal plane, wherein the refractory anchor is configured to be positioned at least partially around a corner of the object such that the two outer corners formed by the second end side are positioned past/behind the object corner seen from the end of the elongated mounting pin welded to the object and the two outer corners formed by the first side are positioned before the object corner seen from the end of the elongated mounting pin welded to the object.

2. The refractory anchor according to claim 1, wherein the smallest vertical height between one of the two outer corners formed by the first side and the horizontal plane is larger than the largest vertical height between one of the two outer corners formed by the second end side and the horizontal plane.

3. The refractory anchor according to claim 1, wherein side surfaces of the at least one anchor fin have substantially the shape of a quarter of an annulus.

4. The refractory anchor according to claim 1, wherein the at least two sides between the first side and the second end side have different lengths.

5. The refractory anchor according to claim 4, wherein a side of the two sides located further away from the object after installation is at least two times longer than the other side of the two sides, wherein the other side is located closer to the object after installation.

6. The refractory anchor according to claim 1, wherein side surfaces of the at least one anchor fin have substantially the shape of a turned L.

7. The refractory anchor according to claim 1, wherein a second anchor fin is connected to the elongated mounting pin, wherein the two anchor fins lie in one virtual plane.

8. The refractory anchor according to claim 7, wherein the at least one anchor fin is connected to a connector, wherein the connector is connected to the elongated mounting pin, wherein the connector and the at least one anchor fin or the two anchor fins are made in one piece, and/or the connector and the at least one anchor fin or two anchor fins are made from the same material.

9. The refractory anchor according to claim 8, wherein the connector provides a through hole for receiving the elongated mounting pin for providing a connection between the elongated mounting pin and the connector, wherein the connection between the elongated mounting pin and the connector is provided by friction fit.

10. The refractory anchor according to claim 1, wherein the elongated mounting pin is made from a different material than the at least one anchor fin.

11. The refractory anchor according to claim 10, wherein the elongated mounting pin is made from a first alloy and the at least one anchor fin is made of a second alloy different from the first alloy.

12. The refractory anchor according to claim 1, wherein the elongated mounting pin is made of a material configured for stud welding the elongated mounting pin to an object.

13. The refractory anchor according to claim 1, wherein the at least one anchor fin is provided with a tab, wherein the tab defines an acute angle with the at least one anchor fin.

14. The refractory anchor according claim 7, wherein each anchor fin has an anchor fin portion extending above the second end of the elongated mounting pin seen in the longitudinal direction of the elongated mounting pin, wherein sides of the anchor fin portions facing each other define a space between these sides, wherein the space is located above the second end of the elongated mounting pin seen in the longitudinal direction of the elongated mounting pin.

15. The refractory anchor according to claim 14, wherein sides of the anchor fin portions facing each other have a cut-out.

16. The refractory anchor according to claim 1, wherein between a connection section of the elongated mounting pin with the at least one anchor fin and the first end, the elongated mounting pin comprises a section where there is a distance measured perpendicular on the elongated mounting pin between a portion of the first side of the at least one anchor fin facing to the elongated mounting pin and the elongated mounting pin.

17. The refractory anchor according to claim 1, wherein the at least one anchor fin has at least one rounded corner, at least the two outer corners of the anchor fin located after installation closer to an object than the at least two other outer corners of the anchor fin are rounded corners.

18. The refractory anchor according to claim 7, wherein an anchor fin end side of the second anchor facing away from the elongated mounting pin comprises a cut-out.

19. The refractory anchor according to claim 1, wherein the refractory anchor comprises only two anchor fins.

20. The refractory anchor according to claim 1, wherein the at least one anchor fin comprises an indicator for aligning the refractory anchor with a transition.

21. An assembly comprising an object and a refractory anchor according to claim 1 welded on the object.

22. A method for providing an assembly according to claim 21, wherein the elongated mounting pin of the refractory anchors are joined to the object by stud welding.

23. The method according to claim 22, wherein the refractory anchor is welded to the object such that the at least one anchor fin is positioned around a corner of the object such that the two outer corners formed by the second end side are positioned past/behind the object corner seen from the end of the elongated mounting pin welded to the object and the two outer corners formed by the first side are positioned before the object corner seen from the end of the elongated mounting pin welded to the object.

* * * * *